United States Patent
Ulicny et al.

(10) Patent No.: US 7,303,679 B2
(45) Date of Patent: Dec. 4, 2007

(54) OIL SPILL RECOVERY METHOD USING SURFACE-TREATED IRON POWDER

(75) Inventors: John C Ulicny, Oxford, MI (US); Mark A Golden, Washington, MI (US)

(73) Assignee: General Motors Corporation, Detroit, MI (US)

(*) Notice: Subject to any disclaimer, the term of this patent is extended or adjusted under 35 U.S.C. 154(b) by 542 days.

(21) Appl. No.: 11/009,417

(22) Filed: Dec. 10, 2004

(65) Prior Publication Data

US 2005/0139550 A1    Jun. 30, 2005

Related U.S. Application Data

(60) Provisional application No. 60/533,569, filed on Dec. 31, 2003.

(51) Int. Cl.
*E02B 15/04* (2006.01)
*B01D 35/06* (2006.01)

(52) U.S. Cl. .............. 210/634; 210/695; 210/712; 252/62.51 R; 252/62.55; 252/62.56

(58) Field of Classification Search ........... 210/634, 210/695, 712; 252/62.51 R, 62.55, 62.56
See application file for complete search history.

(56) References Cited

U.S. PATENT DOCUMENTS

| | | |
|---|---|---|
| 3,635,819 A | 1/1972 | Kaiser |
| 3,717,573 A | 2/1973 | Warren |
| 4,187,187 A | 2/1980 | Turbeville |
| 4,234,420 A | 11/1980 | Turbeville |
| 4,356,098 A * | 10/1982 | Chagnon .............. 252/62.51 R |
| 5,667,715 A | 9/1997 | Foister |
| 5,772,877 A | 6/1998 | Dvorchik et al. |
| 6,149,832 A | 11/2000 | Foister |
| 6,203,717 B1 * | 3/2001 | Munoz et al. ........ 252/62.51 R |
| 6,280,658 B1 | 8/2001 | Atarashi et al. |

* cited by examiner

*Primary Examiner*—David A Reifsnyder

(57) ABSTRACT

A method of recovering spilled hydrocarbon fluids from a body of water utilizing the increased oleophilic properties of reacted iron particles suspended in a magnetorheological (MR) fluid. The iron particles normally used to create MR fluids, are reacted with an organic compound containing an oleophilic chain end which attaches to the surface of the iron, prior to suspension in a liquid vehicle such as an organic oil. The reacted iron particles in the MR fluid are then applied to and mixed with a hydrocarbon spill on a body of water such as an oil spill, whereby subsequent exposure to a significant magnetic field provides for subsequent recovery of both the reacted magnetic particles and the hydrocarbon spill.

19 Claims, No Drawings

OIL SPILL RECOVERY METHOD USING SURFACE-TREATED IRON POWDER

CROSS-REFERENCE TO RELATED APPLICATIONS

This application claims the benefit of U.S. Provisional Application No. 60/533,569, filed on Dec. 31, 2003. The disclosure of the above application is incorporated herein by reference.

FIELD OF THE INVENTION

The present invention relates to the field of separating mixtures of water and oil, and oil spill recovery. Specifically this invention concerns separating an organic liquid such as crude oil from water using a surface-treated iron powder having oleophilic properties.

BACKGROUND OF THE INVENTION

An ever increasing use of petroleum products worldwide has brought with it a proportionate increase in the number of accidental (or deliberate) hydrocarbon oil spills in open bodies of water, rivers, harbors, lakes and oceans. Major spills such as those caused by marine accidents receive widespread notoriety and may have catastrophic effects on sea life and beach fronts. Unfortunately, major spills are distinguished only by their magnitude. Minor spills are more common and, while less deleterious, also receive little attention and clean up efforts. A typical oil spill is the discharge (accidental or deliberate) of from five hundred gallons to several hundred-thousand gallons or more of petroleum product. The materials most frequently spilled are crude oil and heavy diesel oil. Such spills float for extended periods of time, and their residue often washes up on the beaches. Spills of lighter petroleum products such as gasoline or kerosene ultimately evaporate; however the heavier hydrocarbons such as crude oil oxidize or otherwise react with air and water to become more viscous, tar-like liquid. A fully developed petroleum product spill constitutes a thin slick or discontinuous film about 1.5 mm. or less in thickness of this tar like material having a specific gravity of from about 0.8 to 1.0 and drifts freely on the surface of the water, being carried about by wind, wave and current.

At the least, oil spills are a serious pollution problem. Large spills can be disastrous to birds and sea life. Even small spills can foul beaches. The desirability of mopping up oil spills has long been recognized. Unfortunately doing so is very difficult when the oil spill is over a wide area as a thin film, often less than a quarter inch thick, even in an emulsified form with the water. Removing oil from a body of water is difficult and very expensive.

Earlier methods proposed for oil spill recovery generally utilize absorbent pads, siphon off the oil with machines, or treat the oil with detergents to emulsify the oil. All have been used with very limited success. Several inventions in the field describe oil recovery methods involving the use of magnetic particles. U.S. Pat. No. 3,635,819 to Kaiser describes a ferrofluid containing an oil-soluble, water-insoluble, surfactant. The magnetic particles utilized in the ferrofluid have particle diameters in the order of nanometers, which provides the property of manipulating the fluid with a magnetic field. These materials, however, fail to provide the increased affinity of the oil to the magnetic particles. U.S. Pat. No. 4,187,187, to Turbeville, discloses a method and apparatus for pollutant spill control having a synthetic, plastic substrate imbedded with non-abrasive, magnetic iron particles. The oleophilic substrate attracts the hydrocarbons of the pollutant spill, which are then removed from a body of water by the magnetic affiliation properties of the iron particles when introduced to a magnetic field. The substrate is flexible and may be wrung out for subsequent reuse, but is limited in applications on pollutant spills, due to its solid form design.

SUMMARY OF THE INVENTION

The present invention overcomes these obstacles in utilizing the affiliation of the hydrocarbons in an oil spill to reacted, oleophilic iron particles of magnetorheological (MR) fluids to provide for a method of oil spill recovery that has much greater potential for oil spill recovery in a variety of applications and is reusable and recyclable for multiple applications.

The present invention utilizes magnetorheological (MR) fluids to provide a method of oil spill recovery that is reusable for multiple petroleum spills. These magnetorheological fluids are functional fluids which under normal forces are in a liquid state and flowable but which upon application of an electric field or magnetic field or both, undergoes a marked increase in viscosity and changes even into a gel state showing little or no flowability.

The magnetorheological (MR) fluids of the present invention comprise iron particles or powder suspended in a liquid vehicle of organic oil that respond to an applied magnetic field with a acute change in rheological behavior. Typically, this change is manifested by the development of a yield stress that monotonically increases with the applied field. The polarizable iron particles of the MR fluids have a size on the order of a few microns. These particles float freely in fluid until exposed to a magnetic field. They then form stiff chains along magnetic force lines, repelling each another, and the particles expand, giving the once liquid material a consistency like gel or hard wax. If the iron particles or powder have been mixed with oil, the oil wicks into the spaces created by the expansion and sticks there by surface tension. The result is a dry-appearing solid that retains the liquid oil.

The present invention comprises the method of recovering oil spills from a body of water, comprising the steps of; treating iron particles having a mean diameter in the range of one to one hundred micrometers with an organic compound having an oleophilic chain end which attaches to the surface of the iron; combining the treated iron particles with a suspending agent to create an MR fluid, and; applying the treated iron particles to a hydrocarbon spill.

In one embodiment of the invention, iron particles are treated with organic compounds and include long chain alcohols and compounds from the tallow amine group. Once applied to a hydrocarbon oil spill polluting a body of water, the hydrocarbon becomes affiliated with the MR fluid due to the strong oleophilic properties of the treated iron particles. The fluid is then exposed to a magnetic field, inducing the MR fluid to precisely actuate, decreasing flowability and allowing the subsequent removal of the combined MR fluid and oil pollutant. Once removed from the body of water, the MR fluid may be treated with a detergent or separating agent, possibly in conjunction with a mechanical filtration means, to remove the oil from the MR fluid, allowing the MR fluid to be recycled and reused. It is an attribute of the present invention to provide an economical means of recovering hydrocarbon pollutant spills from a body of water.

Another second attribute of the present invention to provide for an oil spill recovery method utilizing a magnetorheological fluid having treated magnetic particles to attract spilled hydrocarbon pollutants on a body of water, for subsequent removal.

It is a further attribute of the present invention to provide for a method of treating the magnetic particles suspended in a magnetorheological fluid to increase oleophilicity of the magnetorheological fluid.

It is another attribute of the present invention to provide a magnetorheological fluid comprising iron particles having an increased resistance to oxidation as a result of the oleophilic treatment.

It is another attribute of the present invention to create an oleophilic magnetorheological fluid which increases viscosity of a hydrocarbon spill and decreases its mobility, improving the ability to control the pollution spill.

It is another attribute of the present invention to provide an oleophilic magnetorheological fluid which may be easily recycled for multiple applications.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiments is merely exemplary in nature and is in no way intended to limit the invention, its application, or uses.

An oil spill recovery method and material for utilizing surface-treated iron powder to recover spilled hydrocarbons is disclosed. In this regard, a magnetorheological (MR) fluid containing iron or ferro magnetic particles are pre-reacted with one or more organic compounds having oleophilic chain ends which subsequently attach to the surface of the iron particles. These oleophilic chain ends increase the affinity of the oil spill to the iron particles.

In providing the greatest oleophilic properties, while still maintaining the normal flowability of an MR fluid under normal conditions, it is preferred to utilize iron particles having a mean diameter in the range of about one to about one hundred micrometers. Since the particles are employed in noncolloidal suspensions, it is preferred that the particles be at the small end of the suitable range, preferably in the range of about one to about ten micrometers in mean particle diameter.

Uniformity in particle size is not required, as it may be preferable to use a combination of particles from two or more size ranges such as disclosed in U.S. Pat. No. 6,149,832 to Foister, incorporated herein by reference, disclosing an ideal MR fluid composition having an improved turn-up ratio, which is the ratio of the torque output generated by the magnetically activated MR fluid (on state) to the torque output for the same fluid in the inactivated or off state. It is usually desired that this ratio be maximized under given operating conditions because one usually wants the off-state viscosity to be of a relatively low value while a relatively high on-state (magnetic field on) yield stress is desired to accomplish the intended retention and handling function of the MR fluid The MR fluids may use any suitable liquid vehicle, such as the one disclosed in the '832 U.S. patent to Foister. Examples of a preferred liquid vehicles include, without limitation, those selected from the group consisting of aliphatic hydrocarbons and glycol esters, and preferably those, having a viscosity at 40° C. no greater than about 100 cP. Further, the MR fluid when formulated with a dispersed group of small particles, has a yield stress at 25° C. (in the absence of a magnetic field) of at least about 200 Pa.

Other suitable liquid vehicles such as those disclosed in U.S. Pat. No. 6,280,658 issued to Atarashi, may be utilized, so long as they are not $H_2O$ miscible, or detract from the oleophilic properties of the MR fluid. Such mediums are nonaqueous solvents including but not limited to alcohols, such as butyl alcohol, higher alcohols (e.g., lauryl alcohol), propylene glycol, and the like.

The surfactant utilized should be limited only in so much as they do not cause side reactions with the liquid vehicle, and they maintain the MR fluid's low water solubility, such as caprylic (C8) through stearic (C18) carboxylic acids. In one preferred embodiment, octadecanol is utilized.

The amount of surfactant needed to react with the iron particles depends upon the quantitative determination of hydroxyl groups on the iron particles, as determined in the '832 U.S. patent to Foister, obtained from chemisorption data of a reactive surfactant, ethoxylated tallow alkylamine. Essentially, the surfactant molecule reacts with an OH group on the iron particle's surface to produce an ether linkage plus one molecule of free water—a typical "condensation" reaction: $M-OH + ROH \rightarrow M-OR + H2O$, where M is the Fe surface and ROH is the surfactant. This reaction can be monitored with near IR spectroscopy (i.e., following the depletion of surfactant in solution). It has been found that 0.00425 g of tallow amine surfactant reacts per g of a particular group of Fe particles. The surfactant has a MW of 480 g/mol. This means that there are $8.9. \times 10^6$ mol reactive sites (i.e., OH groups) per g of Fe.

EXAMPLE I

Preparation of Magnetorheological Fluid

In a reaction, 130 grams of octadecanol were mixed with 600 grams iron powder and 140 ml of isopropanol (IPA). The IPA served as a solvent of the octadecanol. In this regard, the procedure for preparation of octadecanol treated carbonyl iron is as follows. A dry mix of 650 grams BASF HS grade carbonyl iron and 150 g of 1-octadecanol are combined in a 1 liter resin kettle. One hundred fifty ml of 2-propanol is added and stirred until homogeneous. Heat is applied to boil off 2-propanol. A temperature of 200° C. is maintained of the remaining mixture for at least four hours. Let cool and dissolve solid in 500 milliliters of toluene and heat. Filter and repeat toluene wash. Dry mixture above 110° C. in oven to remove residual toluene. The mixture was heated to boiling and held at boiling until the IPA all evaporated. Once the IPA had boiled off, the iron was than cooled and mixed with a liquid vehicle composition. In addition to providing an increased oleophilic property of the MR fluid the invention further prevents subsequent oxidation of the iron particles, due to the surfactant molecule of octadecanol reacting with the OH group on the Fe surface.

After a desired, stabilized MR fluid is formed, it is then contained and stored for subsequent use. When an oil pollutant spill occurs and recovery is desired, the MR fluid is transported to the location and dispersed evenly there over the entire spill. The method utilized for dispersion may include, but is not limited to, spraying, pouring, or any other known methods which preferably would not further assist in spreading or emulsifying the oil pollutant spill in the water. Once distributed over the spill, the MR fluid is then allowed to mix with the oil, either through natural wave motion or through other mechanical means suitable to the specific application.

If the mixture of the spilled oil and treated iron has a significantly high density, the mixture may sink to the bottom of the body of water, whereby the MR fluid effectively sequesters the spilled liquid for subsequent recovery by magnetic means or for subsequent decomposition of the spilled liquid by micro-organisms.

A magnetic field of suitable force is then introduced to the mixture so as to create a relatively high on-state yield stress, increasing the viscosity of the mixture to a suitable handling stage. For example, 1 kG (0.1-1.0 Tesla). This provides the intended retention and handling function of the MR fluid thereby allowing for the recovery of the mixture by any suitable collective means, such as raking, scooping, or lifting by the magnetic means or other methods. Once removed from the body of water by magnetic force, the reacted iron particles may be subsequently separated from the mixture and recycled for future use by means not limited to applying a wash such as a suitable solvent for oil, while retaining the magnetic particles through an applied magnetic force.

In this regard, in a laboratory experiment, about 2 grams (about 2.2 cc) of heavy mineral oil (density about 0.9 g/cc) on top of about 90 grams of water in a shallow dish. About 1 gram of treated iron powder is dispersed over the oil drop. After 4-5 minutes, the iron appeared to absorb the oil (no mixing). A plastic coated magnet (approximate flux density at the end of the bar=1 kilogauss [1 kG]) was contacted to the iron/oil mixture. The magnet with attached iron/oil mixture was then removed from the oil drop and the magnet was wiped clean with a paper towel. The process was repeated until there was visually little or no iron remaining. An additional gram of treated iron powder was added to the oil on the water and repeated the above process. The weight of the container was monitored throughout the process. The measured weights indicated that 100% of the oil was removed from the water although a small droplet could still be seen at the surface. It was concluded that, conservatively, at least 90% of the oil was removed by this process and that a minimum weight ratio of treated iron to oil to use is about 1:1.

It is additionally envisioned that liquid hydrocarbon material dispersed in a volume of water can be recovered with direct dispersion of the aforementioned treated iron particles. The treated iron particles are mixed into the liquid hydrocarbon material, to form magnetorheological fluid. It is envisioned that surfactants and suspension agents can optionally be added directly with the treated iron powder. After mixing, a predetermined magnetic force is applied to the now formed magnetorheological fluid. Removal of the magnetorheological fluid and associated liquid hydrocarbon material from the volume of water is accomplished using filtering or mechanical separation.

The description of the invention is merely exemplary in nature and, thus, variations that do not depart from the gist of the invention are intended to be within the scope of the invention. For example, separation is possible using detergents. Additionally, separation can be accomplished using filtering. In this regard, the filtering can either be mechanical or can utilize static or induced magnetic medium. It is envisioned that centrifugal methods can additionally be used to segregate a large portion of the oil. Such variations are not to be regarded as a departure from the spirit and scope of the invention.

What is claimed is:

1. A method of recovering a liquid hydrocarbon material dispersed in a volume of water comprising the steps of:
    reacting a plurality of iron particles with at least one organic compound having an oleophilic chain end that attaches to the surface of the iron particles;
    mixing said iron particles into the liquid hydrocarbon material to form a magnetorheological fluid;
    applying a magnetic force of predetermined strength to said magnetorheological fluid so as to increase the viscosity of the magnetorheological fluid to a semi-solid gel form; and
    removing said magnetorheological fluid from said volume of water while maintaining the applied magnetic force.

2. A method according to claim 1 wherein said iron particles have a mean diameter in the range of about one to about one hundred micrometers.

3. A method according to claim 1 wherein said organic compound is an alcohol, said alcohol comprising a chain of between 10 and 18 carbon atoms, said chain being configured to attach to the surface of said iron.

4. A method according to claim 1 wherein said organic compound is a saturated fatty acid said chain end comprising between about 8 and about 18 carbon atoms, said chain end attaching to the surface of said iron.

5. A method according to claim 1 wherein said organic compound reacted with said iron is a tallow amine.

6. A method according to claim 1 further including the step of mixing a surfactant into the liquid hydrocarbon material.

7. A method of separating a liquid hydrocarbon material from a body of water comprising the steps of:
    reacting a plurality of iron particles having a mean diameter in the range of one to one hundred micrometers with at least one organic compound having minimal water solubility and having an oleophilic chain end that attaches to the surface of said iron particles;
    mixing said iron particles with the liquid hydrocarbon material forming a magnetorheological fluid;
    mixing said magnetorheological fluid with at least one of a surfactant, a suspending agent, and mixtures thereof;
    applying a magnetic force of predetermined strength to said magnetorheological fluid so as to increase the viscosity of the magnetorheological fluid to a semi-solid gel form;
    removing said magnetorheological fluid from said body of water while maintaining the applied magnetic force; and
    separating said iron particles from said liquid hydrocarbon material.

8. A method as in claim 7 wherein said organic compound reacted with said iron is an alcohol, said alcohol configured to be attached to the surface of said iron particles.

9. A method as in claim 7 wherein said organic compound is a saturated fatty acid and said chain end comprises between about 8 and about 18 carbon atoms, said chain end being configured to attach to the surface of said iron.

10. A method as in claim 7 wherein said organic compound is a tallow amine.

11. A method as in claim 7 wherein when said magnetic force is applied, the magnetorheological fluid forms a semi-solid gel.

12. A method as in claim 7 including the step of separating said magnetorheological fluid from said oil comprises applying an organic oil solvent to the mixture.

13. A method of recovering a liquid hydrocarbon material from a body of water comprising the steps of:
   reacting a plurality of ferromagnetic particles having a mean diameter in the range of one to one hundred micrometers with at least one organic compound having minimal water solubility and having an oleophilic chain end that attaches to the surface of said ferromagnetic particles;
   mixing said ferromagnetic particles with the liquid hydrocarbon material forming a magnetorheological fluid;
   applying a magnetic force of a predetermined strength to said magnetorheological fluid so as to increase the viscosity of the magnetorheological fluid to a semi-solid gel form;
   removing the magnetorheological fluid from said body of water while maintaining the applied magnetic force;
   removing said magnetic force; and
   separating said ferromagnetic particles fluid from said magnetorheological fluid.

14. A method as in claim 13 wherein said organic compound is an alcohol, said alcohol configured to be attached to the surface of said ferromagnetic particles.

15. A method as in claim 14 wherein said organic compound is a saturated fatty acid and said chain end comprises between about 8 and about 18 carbon atoms and is configured to attach to a surface of said ferromagnetic particles.

16. A method as in claim 15 wherein said organic compound is a tallow amine.

17. A method as in claim 16 wherein when said magnetic force is applied, the magnetorheological fluid forms a semi-solid gel.

18. A method as in claim 17 including the final step of separating said ferromagnetic particles from said magnetorheological fluid comprises applying an organic oil solvent to the mixture.

19. A method of recovering liquid hydrocarbon material from a volume of water comprising the steps of:
   reacting a plurality of iron particles with at least one organic compound having an oleophilic chain end that attaches to the surface of the iron particles;
   mixing said iron particles into a suspension, said suspension comprising an organic oil and at least one surfactant and suspending agent, and mixtures thereof, forming a magnetorheological fluid;
   mixing said magnetorheological fluid into said liquid hydrocarbon material to form a mixture;
   applying a magnetic force of predetermined strength to said mixture so as to increase the viscosity of the mixture to a semi-solid gel form; and
   removing said mixture from said volume of water while maintaining the applied magnetic force.

* * * * *